July 24, 1923.
H. E. COUNTER
1,462,685
DRAFT APPLIANCE FOR TRACTORS
Filed June 23, 1921
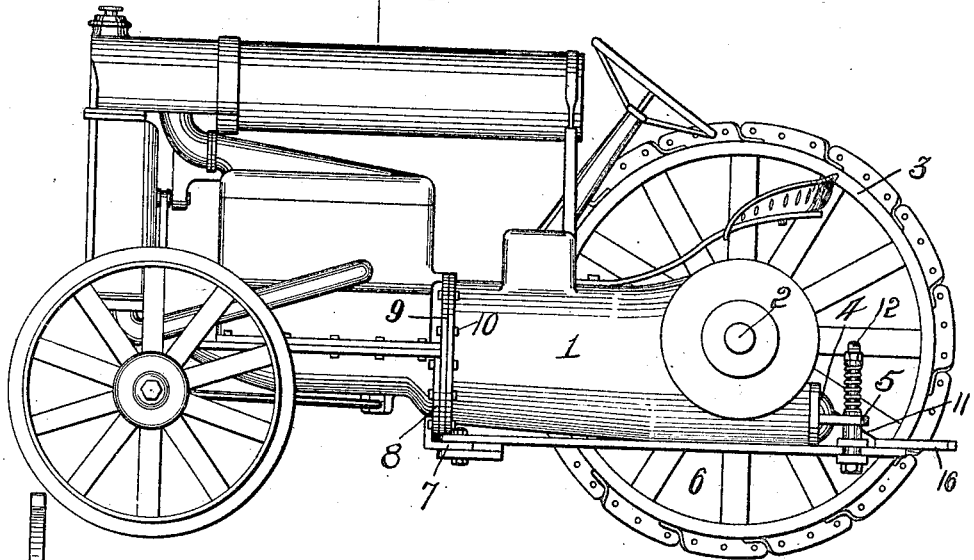
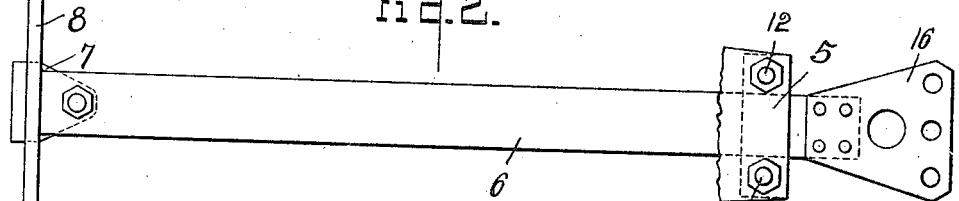
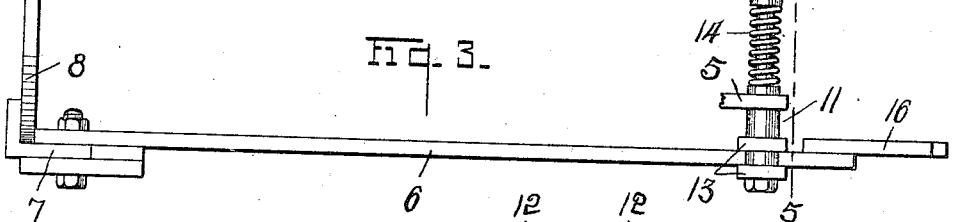
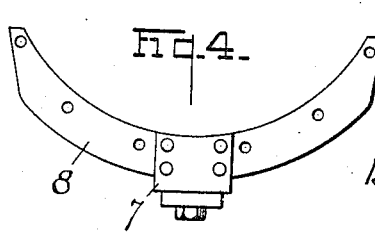
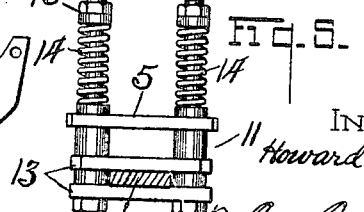
INVENTOR
Howard E. Counter,
By Owen Owen & Crampton,
Attys.

Patented July 24, 1923.

1,462,685

UNITED STATES PATENT OFFICE.

HOWARD E. COUNTER, OF LEIPSIC, OHIO.

DRAFT APPLIANCE FOR TRACTORS.

Application filed June 23, 1921. Serial No. 479,739.

*To all whom it may concern:*

Be it known that I, HOWARD E. COUNTER, a citizen of the United States, and a resident of Leipsic, in the county of Putnam and State of Ohio, have made an Invention Appertaining to Draft Appliance for Tractors; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to draft appliances and particularly to one adapted for use on Fordson tractors.

In the use of Fordson tractors, and possibly some others, it is customary to apply the draft to the frame at the rear of the drive wheel axle and to provide a worm and worm wheel drive between the motor shaft and rear drive axle. With this arrangement it is found in practice that when the tractor is subjected to a sudden or heavy load, the tractor will topple over backwards due to the retarding or stopping of the driving action of the tracting wheels and the continued turning of the worm in engagement with the stationary or retarded worm-wheel, so that the worm will tend to travel around the worm-wheel and in so doing will cause a raising and back turning of the tractor frame about the rear axle as a pivot, thereby killing or severely injuring the driver, unless he is exceedingly quick in jumping from the tractor when turning. Numerous persons have been killed or injured from this cause and endeavors have been made, without success so far as I am aware, to overcome this objectionable feature.

The object of my invention is to provide a safety draft appliance for tractors of this character and so connect them to the tractor frames that it is impossible to cause a back turning of the tractor when heavy or sudden loads are applied.

The invention is fully described in the following specification, and while in its broader aspect it is capable of embodiment in numerous forms, a preferred embodiment thereof is illustrated in the accompanying drawings, in which,—

Figure 1 is a side elevation of a tractor embodying the invention with one of the drive wheels removed. Fig. 2 is a top plan view of the draft appliance embodying the invention with a part broken away. Fig. 3 is a side elevation thereof. Fig. 4 is a front end elevation thereof, and Fig. 5 is a section on the line 5—5 in Fig. 3.

Referring to the drawings, 1 designates the frame of a tractor of the class described, 2 the rear driving axle thereof, and 3 a drive wheel, one of which is mounted on each end of the axle. The frame 1 is provided at its rear end below and to the rear of the axle 2 with the customary draw bar cap 4 having the draw bar attaching tongue 5 projected therefrom. This tongue is provided with a pair of clevis receiving openings which are spaced transversely thereof.

The draft appliance embodying my invention comprises a draw bar 6, which extends under the frame 1 from a point to the rear thereof and has its forward end bolted to a tongue 7 extending rearward from the central portion of a segmental yoke 8, that bears rearward against the front side of the frame flange 9 and is bolted thereto. The flange 9 comprises the meeting flanges of the front and rear frame or casing portions of the frame 1, the flanges being secured together by bolts 10. In applying the draft yoke 8 the bolts 10 are removed from the lower portion of the flange 9 and longer bolts substituted therefor so as to serve to attach the yoke thereto.

The rear end portion of the draw bar 6 extends through a guide or bracket means 11, which is suspended from the draw bar cap tongue 5, preferably for vertical yielding movements relative thereto. This guide means comprises two bolts 12, which extend up through the clevis receiving openings of the tongue 5 and carry spaced cross members 13 at their lower ends between which the draw bar 6 projects. The bolts project a distance above the tongue 5 and each has a coiled compression spring 14 mounted thereon with its upper end thrust against a tension adjusting nut 15 on the bolt and its lower end thrust against the tongue 5 so that the guide means 11 may yieldingly lower with respect to the tongue 5 upon a compression of the springs. This yielding feature of the guide means 11 is important as it normally holds the rear end of the draw bar elevated in the normal line of draft and at the same time permits the rear end of the draw bar to lower and adjust itself to the line of draft should such line be lower than the normal line of draft for which the draw bar is set. Without this adjusting feature it is found that when the line of draft is rearward and downward from the point of attachment of the draw bar to the frame instead of along the normal position of the draw bar and the tractor is subjected to a sudden or heavy load it will tend to raise up in front. The draw bar 6 is provided at its rear end with a clevis attaching plate 16.

It is found in practice that the use of my draft appliance means, particularly when used in connection with a Fordson tractor, will prevent the raising up in front and toppling over backward of the tractor when subjected to heavy or sudden loads, as the draft is applied to the frame at a point in advance of the axle and the draw bar is permitted to adjust itself to the line of draft. It is evident that the appliance may be easily and quickly attached to any Fordson tractor by simply removing a portion of the frame flange bolts 10 and substituting longer ones therefor which pass through the yoke 8.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent, is,—

1. A draft appliance for tractors including a member formed for securement to the crank case flange and having a rearwardly projecting tongue, a draw bar secured at one end to the tongue, a pair of cross members engaged with the respective upper and lower faces of the draw bar at the opposite end of the latter, a pair of bolts having their lower ends secured to the said cross members and having their sides engaged with opposite side edges of the last named end of the draw bar, said bolts having their upper ends extending above the upper cross member and formed to extend through the respective clevis receiving openings of the draw bar attaching tongue of the tractor, compression springs encircling said upper ends of the bolts and having their lower ends formed to bear against the tractor draw bar attaching tongue and adjusting nuts on the upper ends of the bolts engaging the upper ends of the springs.

2. A draft appliance for tractors including a member formed for securement to the crank case flange and having a rearwardly projecting tongue, a draw bar secured at one end to the tongue, a guiding device formed to receive the opposite end of the draw bar, a pair of bolts connected to said device and formed to extend through the respective clevis receiving openings of the draw bar attaching tongue of the tractor, and coil springs carried by the bolts and exerting pressure against said tractor tongue.

3. A draft appliance for tractors including a member formed for securement to the crank case flange and having a rearwardly projecting tongue, a draw bar secured at one end to the tongue, a guiding device formed to receive the opposite end of the draw bar, a pair of bolts connected to said device and formed to extend through the respective clevis receiving openings of the draw bar attaching tongue of the tractor, and to guidingly engage the respective side edges of the draw bar, coil springs carried by the upper ends of the bolts and disposed above the tractor tongue to exert downward pressure on and against the latter, and means on the upper ends of the bolts to regulate the tension of the springs.

In testimony whereof, I have hereunto signed my name to this specification.

HOWARD E. COUNTER.